United States Patent
Wang et al.

(10) Patent No.: US 8,074,274 B2
(45) Date of Patent: Dec. 6, 2011

(54) USER-LEVEL PRIVILEGE MANAGEMENT

(75) Inventors: Hong Wang, Fremont, CA (US);
Gautham Chinya, Hillsboro, OR (US);
Perry Wang, San Jose, CA (US);
Jamison Collins, San Jose, CA (US);
Richard A. Hankins, San Jose, CA (US); Per Hammarlund, Hillsboro, OR (US); John Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1188 days.

(21) Appl. No.: 11/648,009

(22) Filed: Dec. 29, 2006

(65) Prior Publication Data
US 2008/0163366 A1    Jul. 3, 2008

(51) Int. Cl.
*G06F 7/00* (2006.01)

(52) U.S. Cl. ......... 726/18; 726/2; 726/5; 726/6; 726/16; 726/17; 713/182; 712/220

(58) Field of Classification Search ......... None
See application file for complete search history.

(56) References Cited

U.S. PATENT DOCUMENTS

| | | | | |
|---|---|---|---|---|
| 5,953,741 A * | 9/1999 | Evoy et al. | ...... | 711/132 |
| 6,349,363 B2 * | 2/2002 | Cai et al. | ...... | 711/129 |
| 6,766,515 B1 * | 7/2004 | Bitar et al. | ...... | 718/100 |
| 7,743,233 B2 * | 6/2010 | Wang et al. | ...... | 712/220 |
| 7,768,518 B2 * | 8/2010 | Collins et al. | ...... | 345/505 |
| 2002/0123981 A1 * | 9/2002 | Baba et al. | ...... | 707/1 |
| 2003/0115476 A1 * | 6/2003 | McKee | ...... | 713/193 |
| 2005/0050395 A1 * | 3/2005 | Kissell | ...... | 714/38 |
| 2005/0223199 A1 * | 10/2005 | Grochowski et al. | ...... | 712/235 |
| 2006/0150184 A1 | 7/2006 | Hankins et al. | ...... | 718/100 |
| 2006/0224858 A1 | 10/2006 | Wang et al. | ...... | 711/202 |
| 2007/0150900 A1 * | 6/2007 | Hankins et al. | ...... | 718/108 |
| 2007/0157211 A1 * | 7/2007 | Wang et al. | ...... | 719/313 |

OTHER PUBLICATIONS

U.S. Appl. No. 11/477,643, filed Jun. 29, 2006, entitled "Handling Address Translations and Exceptions of a Heterogeneous Resource," by Hong Wang, et al.
U.S. Appl. No. 11/173,326, filed Jun. 30, 2005, entitled "A Mechanism for Instruction Set Based Thread Execution on a Plurality of Instruction Sequencers" by Hong Wang et al.
U.S. Appl. No. 11/321,779, filed Dec. 29, 2005, entitled "Instruction Set Architecture-Based Inter-Sequencer Communications With a Heterogeneous Resource" by Hong Wang et al.

* cited by examiner

*Primary Examiner* — Thanhnga Truong
*Assistant Examiner* — Amir Mehrmanesh
(74) *Attorney, Agent, or Firm* — Trop, Pruner & Hu, P.C.

(57) ABSTRACT

In one embodiment, the present invention includes a method for receiving a request from a user-level agent for programming of a user-level privilege for at least one architectural resource of an application-managed sequencer (AMS) and programming the user-level privilege for the at least one architectural resource using an operating system-managed sequencer (OMS) coupled to the AMS. Other embodiments are described and claimed.

23 Claims, 7 Drawing Sheets

USER-LEVEL PRIVILEGE MANAGEMENT

BACKGROUND

Computer systems include various components to process and communicate data. Typical systems include one or multiple processors, each of which may include multiple cores, along with associated memories, input/output (I/O) devices and other such components. To improve computation efficiencies, computation accelerators, special-purpose I/O devices and other such specialized units may be provided via one or more specialized components, referred to generically as helper units. However, inefficiencies may occur in using such helper units, as in a typical computing environment that implements a general-purpose processor and an industry-standard operating system (OS) environment, a software stack can impede efficient usage. That is, in a typical OS environment, system software is isolated from application software via different privilege levels, and operations in each of these different privilege levels are subject to OS context save and restore operations, among other limitations. Further, helper units typically lack the ability to handle processing of exceptions and faults that allow robust handling of certain events during execution.

Classic examples of a computation accelerator are coprocessors such as math coprocessors like so-called x87 floating point coprocessors for early Intel® Architecture (IA)-32 processors. Typically, such coprocessors are coupled to a main processor (e.g., a central processing unit (CPU)) via a coprocessor interface, which is of a common instruction set architecture (ISA) as the main processor. More recently, separate resources having different ISAs have appeared in systems.

In traditional systems, a privilege level (or ring-level) is primarily used to distinguish or isolate, and thus protect resources between a supervisor program (e.g., an OS kernel at Ring-0) and an application program (e.g. regular applications at Ring-3). Since the OS has system level access privilege to system-level resources, application software cannot directly access these resources. Through system services (e.g. explicit syscall and "implicit" page fault and structured exception handling) provided by the OS or basic input/output system (BIOS), an application can indirectly "access" some system resources through OS. However, this indirect access is time consuming and complex, and requires OS control of privilege support.

DETAILED DESCRIPTION

In various embodiments, mechanisms are provided to enable user-level management of access privileges. Architectural enhancements may support user-level privilege management for accessing application architectural resources in a multi-sequencer system. In particular, embodiments can provide user-level applications direct control of programmable and differentiated accesses privileges to user-level architected resources, including registers, virtual memory, events, sequencers, and so forth. As used herein, a "sequencer" is a distinct thread execution resource and may be any physical or logical unit capable of executing a thread. A sequencer may be a logical thread unit or a physical thread unit, and may include next instruction pointer logic to determine the next instruction to be executed for the given thread.

In many implementations, a system may include a first sequencer of a first ISA and a second computation resource (which may be a sequencer or non-sequencer) of a heterogeneous nature. That is, the second resource may be a sequencer of a different ISA or may be a non-sequencer resource, such as a fixed function unit (FFU), an application specific integrated circuit (ASIC) or other pre-programmed logic. In various embodiments, an intermediary or interface, referred to herein as an "exo-skeleton," may provide for communication between such heterogeneous resources. In different embodiments an exo-skeleton may take various forms, including software, hardware, and/or firmware, such as a finite state machine (FSM) tightly coupled to the heterogeneous resource. Of course, other implementations are possible.

Figure 1:
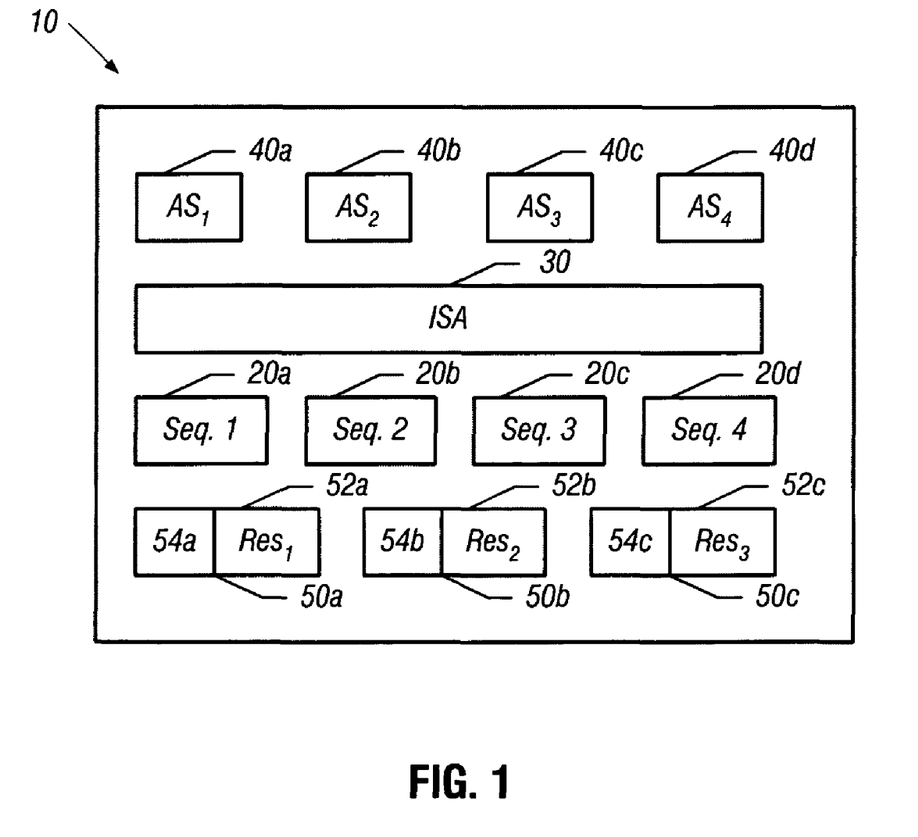
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 includes a variety of different resources. In different implementations, processor 10 may be a single core processor or a multi-core processor. Such a processor may be implemented in different types of systems, including a chip multiprocessor (CMP) system, a simultaneous multithreading (SMT) system or a switch-on-event multithreading (SoeMT) system, among other such systems.

As shown in FIG. 1, processor 10 includes a plurality of sequencers 20a, 20b, 20c, and 20d (i.e., sequencers 1-4, and generically sequencers 20). While shown with four such sequencers in the embodiment of FIG. 1, it is to be understood that the scope of the present invention is not so limited. As shown in FIG. 1, sequencers 20 in processor 10 implement an ISA 30, which in one embodiment may be an Intel® Architecture (IA-32) instruction set architecture and/or its 64-bit extension (also called Intel® extended memory 64-bit technology (EM64T)). Processor 10 further includes other resources, including a first resource (i.e., resource 1) 50a, a second resource (i.e., resource 2) 50b, and a third resource 50c (i.e., resource 3) (and generically resources 50). These resources may be heterogeneous resources that do not implement ISA 30 of processor 10. While shown in the embodiment of FIG. 1 as including three such resources, more or fewer are possible in different embodiments.

Each resource 50 includes a sequencer (which may implement a different ISA from ISA 30), non-sequencer processing engine, or other specialized functional logic, referred to generically herein as an accelerator. In different embodiments, different types of resources may be implemented as accelerators, including a graphics processing unit (GPU) (typically a sequencer), a cryptographic unit (typically a non-sequencer), a physics processing unit (PPU) (typically a non-sequencer), a fixed function unit (FFU) (typically a non-sequencer) and the like. As shown in FIG. 1, each resource 50 may include an accelerator 52 (generically) and more specifically, accelerators 52a, 52b, and 52c, each associated with one of resources 50a-50c. Accelerators 52 are also referred to herein as helper units. Because resources 50a-50c may be of another ISA or may even be a non-sequencer and as such can be heterogeneous with respect to sequencers 20, an interface may be used to provide the ability to communicate with such resources. Specifically as shown in FIG. 1, exo-skeletons 54a, 54b, and 54c (generically exo-skeleton 54) may be associated with each of resources 50. Each resource 50 may thus be referred to as an "exo-sequencer," indicating the tight coupling between exo-skeleton 54 and its associated accelerator 52. In this manner, these heterogeneous resources may be integrated with homogeneous sequencer resources in a unified ISA framework that supports inter-sequencer communication.

However in other embodiments, resources 50 may be homogeneous sequencer resources with respect to sequencers 20 and can be symmetric cores such that they include the same or similar architecture as sequencers 20. In such manner, concurrent fibers may be implemented and legacy OS scalability can be enhanced. Still further, in other implementations resources 50 may be asymmetric cores. In other words, these resources may be of the same ISA as sequencers 20, but of a different micro-architecture. Such embodiments may help manage the asymmetry and provide compatibility with a legacy OS. For embodiments that implement heterogeneous resources, an exo-skeleton may provide the illusion that these heterogeneous resources are of a common ISA to achieve minimal compliance for inter-sequencer communications. Thus in various embodiments, a heterogeneous resource can function as a user-level functional unit resource (rather than a system-level device).

While shown with the particular resources in the embodiment of FIG. 1, it is to be understood that processor 10 may be a single physical processor that can support multiple hardware thread contexts (without loss of clarity, also called "thread context", note this is not the same as software thread context), each including a set of the architectural state. In some embodiments, certain resources may be visible to these thread contexts, while other resources are invisible. Thus as shown in FIG. 1, each of sequencers 20 may correspond to a thread context. When at least some of these thread contexts (e.g., m out of n, m$\leq$n) are made visible to the operating system, these thread contexts are sometimes referred to as logical processors or OS-managed sequencers (OMS's). Each thread context maintains a set of the architecture state AS1-ASn, respectively. The architecture state includes, for example, data registers, segment registers, control registers, debug registers, and most of the model specific registers. As will be described further below, the architecture state further includes a sequencer-wise privilege descriptor (SPD) that may be used to store a user-level privilege level (UPL) that itself is set under user-level (i.e., non-OS) control. The thread contexts may share most micro-architectural resources of the physical processor, such as caches, execution units, branch predictors, control logic and buses. Although such features may be shared, each thread context of processor 10 can independently generate a next instruction address (and perform, for instance, a fetch from an instruction cache, an execution instruction cache, or trace cache). Each of sequencers 20 corresponding to a thread context is associated with a corresponding architecture state 40 (generically). More specifically, architecture state (AS1) 40a may be associated with sequencer 20a, AS2 40b may be associated with sequencer 20b, AS3 40c may be associated with sequencer 20c, and AS4 40d may be associated with sequencer 20d, for example.

Using processor 10 or a similar such processor, ISA-based inter-sequencer communications, as well as access privilege management may occur without involving an OS. For example, in a shared-memory multiprocessing paradigm an application programmer may split a software program (i.e., an application or process) into multiple tasks to be run concurrently in order to express parallelism. All threads of the same software program ("process") share a common logical view of memory address space. However, an OS thread may be associated with multiple user-level threads that may not be created, scheduled, or otherwise managed by the operating system. Such user-level threads may be referred to as "shreds," in order to distinguish them from OS threads. These shreds may not be visible to the OS scheduler and therefore the OS does not manage when or how the associated OS thread schedules a shred to run on an assigned logical sequencer address. The OS thread is itself usually responsible to schedule when and how to run one of its shreds. Still further, the OS thread may set privilege levels for the various architectural resources of the different sequencers on which the threads are executed.

Architectural support for ISA-based inter-sequencer communications may include extensions to an ISA such that one or more instructions are provided to allow a user to directly manipulate control and state transfers between sequencers. Such instructions may include instructions that either provide for a first sequencer to signal another (i.e., a second) sequencer (one instruction is referred to herein as a shred transfer or "SXFR" instruction, which may send egress control information, called an egress scenario, and may also carry data payload) or provide for setting up a second sequencer to monitor for such a signal (referred to herein as a shred monitor or "SEMONITOR" instruction) and perform control transfer to a handler upon receiving the signal (called an ingress scenario) asynchronously.

In embodiments in which accelerator 52 is of a heterogeneous ISA or is a non-sequencer, the corresponding exo-skeleton 54 may be implemented so that accelerator 52 can participate in inter-sequencer communications. Such ISA-based inter-sequencer communications provide a signaling protocol in an ingress direction into accelerator 52 so that it may monitor and respond to ingress scenarios sent by SXFR from another sequencer or exo-sequencer, including GET and/or SET instructions for the exo-sequencer's architectural state. Furthermore, the signaling protocols include egress communications from accelerator 52 to signal a corresponding sequencer 20 with an egress scenario including an indication for exception handling such as a proxy execution request for such events as page faults or exceptions. To reduce overhead, ISA-based inter-sequencer communication between sequencer 20 and accelerator 52 via sequencer-aware instructions may not require involvement of an OS. In this way, a device driver stack of the OS can be avoided and instead direct communications between sequencer 20 and accelerator 52 can be effected.

Figure 2:
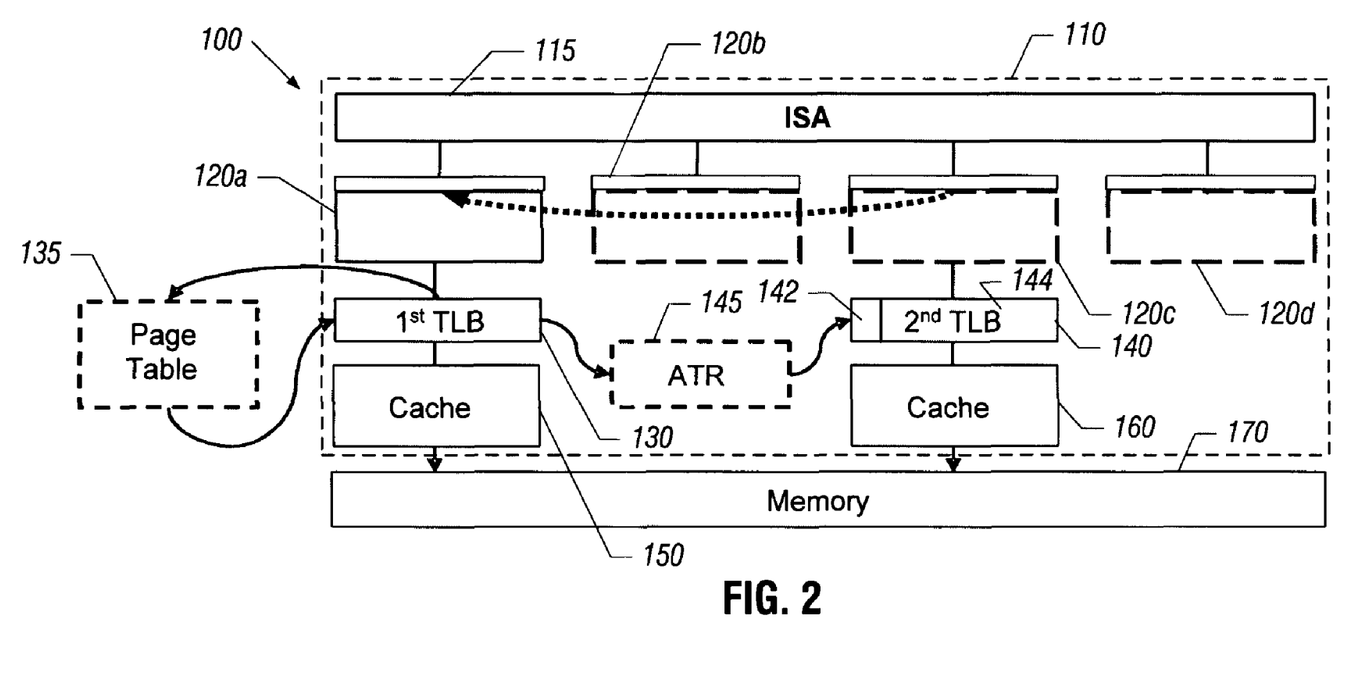
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 100 includes a processor 110 which may be a CMP having a plurality of sequencers. Specifically, the embodiment of FIG. 2 includes four sequencers $120_a$-$120_d$ (generically sequencer 120). While shown with four such sequencers for purposes of illustration, it is to be understood that the scope of the present invention is not limited in this regard. In many implementations, one or more of sequencers $120_a$-$120_d$ may be of a heterogeneous ISA or another heterogeneous resource with regard to a native ISA 115 of system 100. For purposes of explanation, first sequencer $120_a$ may be a sequencer of the native ISA. For example, in one embodiment first sequencer $120_a$ may be an IA-32 CPU, although the scope of the present invention is not limited in this regard. Accordingly, first sequencer $120_a$ operates as an OMS. One or more other sequencers 120 may also be IA-32-based sequencers implementing native ISA operation. However, at least one of sequencers 120, e.g., third sequencer $120_c$ may be a heterogeneous sequencer. For purposes of illustration, third sequencer $120_c$ may be a heterogeneous resource, e.g., a graphics processing unit (GPU) or another such heterogeneous engine of a different (non-native) ISA. As such, third sequencer $120_c$ operates as an application-managed exo-sequencer. As an example, first sequencer $120_a$ may run an IA-32-based single-image OS like Windows™ or Linux™, and through inter-sequencer signaling mechanisms inter-operate with third sequencer $120_c$, e.g., via SXFR based inter-sequencer signaling mechanisms. To enable ISA-based inter-sequencer communications third sequencer $120_c$ may include an exo-skeleton. Together, the exo-skeleton and its underlying third sequencer $120_c$ together are also referred to herein as an exo-sequencer.

Inter-sequencer communication mechanisms between third sequencer $120_c$ and first sequencer $120_a$ may be used to perform page fault handling in first sequencer $120_a$ in a proxy execution mode. Accordingly, when code running on third sequencer $120_c$ incurs an architectural fault (e.g., page fault) or micro-architectural fault condition (e.g., TLB miss), e.g., with respect to virtual to physical address translations, the faulting condition on third sequencer $120_c$ may be handled on first sequencer $120_a$ as implemented by the native OS. Thus as shown in FIG. 2, on such a fault condition, third sequencer $120_c$ passes a message to first sequencer $120_a$, e.g., via a SXFR message. In turn, first sequencer $120_a$ may perform a fault handling procedure, which may be hardware, software or firmware-based or a combination thereof, to determine if the faulting address is present in a first translation lookaside buffer (TLB) 130 coupled to processor 110. If not, a page walk mechanism is initiated to cause the requested page to be obtained from a page table 135 and be stored in first TLB 130. Note that the page walk mechanism from first TLB 130 to page table 135 is implemented according to an OS-enabled page walking mechanism that is supported in hardware including conventional processor TLB design and in OS software including the virtual memory system. Consequently, this virtual-to-physical address translation (e.g., page table entry) in the format of sequencer $120_a$ is re-mapped according to an address translation re-mapping mechanism (re-mapper) 145 to a format that is native to third sequencer $120_c$. This remapped page translation can then be provided to second TLB 140 coupled to third sequencer $120_c$. In turn, third sequencer $120_c$ now can access the same physical page provided by first sequencer $120_a$. In effect, both sequencers $120_a$ and $120_c$ can share the common virtual address space despite the heterogeneity between the two sequencers.

As will be described further below, second TLB 140 may include a plurality of entries each having a permission indicator field 142 and a translation field 144. When access permission for a page table entry in second TLB 140 has been determined by first sequencer $120_a$, the corresponding permission indicator field 142 may be set to indicate that instructions that access the corresponding entry can retire in third sequencer $120_c$ without the need for proxy execution on first sequencer $120_a$. Re-mapper 145 may be implemented in hardware, software or firmware, or a combination thereof. Further, as represented by the dashed box in FIG. 2, the functionality of re-mapper 145 may be implemented as part of first sequencer $120_a$ or third sequencer $120_c$, for example. In this way, the faulting condition is handled in a native mode, and the requested information is provided to third sequencer $120_c$, such that a faulting condition of a heterogeneous resource, e.g., third sequencer $120_c$ may be gracefully handled by an OS running on an OMS, e.g., first sequencer 120a.

Note further in the embodiment FIG. 2, additional levels of a memory hierarchy are present. Specifically, as shown in FIG. 2, a cache memory 150 is coupled to first TLB 130, and a corresponding cache memory 160 is coupled to second TLB 140. In turn, caches 150 and 160 are coupled to a memory 170, which in one embodiment may be a dynamic random access memory (DRAM). While shown with this particular implementation in the embodiment FIG. 2, it is to be understood that the scope of the present invention is not limited in this regard.

User-level privilege management may enable diverse usage models. For example, in a web browser running on a multi-sequencer system, a known attack to the underlying system is a virus or unsafe code run through a plug-in or Java Native Interface (JNI) component as regular Ring-3 code. Using embodiments of the present invention, the web browser can turn the function call into a user-level shred in which the potentially unsafe module can be run. The shred can then be sent by an OMS to run on an AMS for which access privilege level is programmed to be more constrained than the OMS. Upon an access violation on the AMS, the OMS runtime may be notified to inspect the behavior of the unsafe code module, without any involvement of the operating system.

Embodiments thus support a user-level runtime software layer that can provide component structured modularity with high robustness, reliability, security, which are hallmark benefits and advantages of a microkernel-based OS over monolithic systems. However, unlike a microkernel OS, embodiments may be provided at the user-level application architecture level. Consequently, application runtime software that leverages embodiments is not kernel OS components operating in system privileged level, and runtime application software can attain most if not all benefits of microkernel design (in terms of enhanced robustness, reliability and security) without requiring (or orthogonal to or independent of) whether the underlying OS is of a microkernel architecture or monolithic.

As described above, an OMS can use the SXFR instruction to assign a shred continuation to an AMS, in effect spawning the shred to execute on the AMS. In turn, an AMS can use SXFR to signal an OMS about an exception condition incurred on the AMS, and the OMS can then use SXFR with a sequencer state save instruction (SSAVE) to attain the AMS's state including the continuation information of the faulting shred, and inspect the states and potentially repair the state via proxy execution. Afterwards, the OMS can use SXFR with a sequencer state restore instruction (SRSTOR) to let the AMS assume the "repaired" sequencer state and resume the shred execution. Note that AMSs may be asymmetric relative to the OMS in terms of ISA, functionality, performance, and power, just to name a few. In some embodiments, any attempt by an AMS to access OS services (e.g., syscall or page fault or exception handling) may be architecturally detected and redirected to the OMS for proxy execution on behalf of the AMS.

Embodiments may be used to define and manage discriminated access privileges to application level resources (instead of just OS services and resources). In this way, embodiments fundamentally provide a dimension of asymmetry between user-level managed sequencers in terms of resource access privileges, and related ISA-based mechanisms for user-level privilege management. Microarchitectural mechanisms to support user-level privilege management may be highly scalable and primarily off-critical path in terms of complexity-efficiency of underlying pipeline design. In addition, user-level privilege management may be an architectural virtualization resource, like register resource virtualization via renaming, memory resource virtualization via virtual memory system and sequencer resource virtualization via sequencer virtualization.

For each architectural AMS resource, a SPD, (that is, a sequencer-wise privilege descriptor) i.e., an application-level architectural state may be provided. In general, an SPD can be implemented in a variety of embodiments. At a minimum, the SPD state of an AMS may be a register or other storage representing a bit vector. In some embodiments, the SPD may only be accessed by the OMS via application level instructions for sequencer state save and restore, including SSAVE/RSTOR operations at current privilege level 3 (CPL3) and FXSAVE/RSTOR operations at CPL0 (which the OS uses during thread context switches). Alternatively, the SPD state can be a record implemented in application memory, and only a pointer to the SPD record is maintained in a register. Access to this register can be via state save and restore operations. For descriptive convenience without loss of generality, a register-based bit vector implementation of an SPD may be assumed. Should an embodiment support the SXFR command scenario (e.g., GET/SET) for inter-sequencer accessing of finer granularity architectural state information, a SPD may be another user-level register state that can be "remotely" read/written by the OMS without going through memory.

Figure 3A:
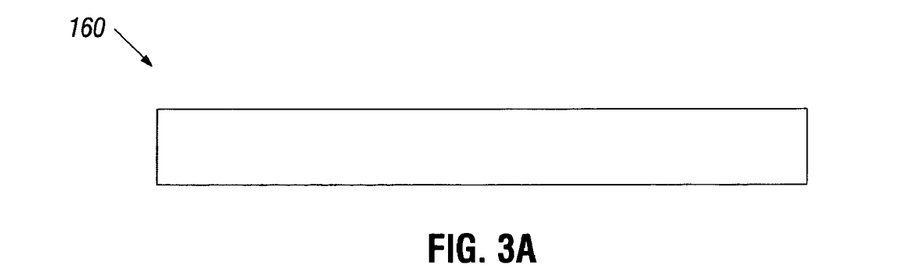
FIG. 3A is a block diagram of a sequencer privilege descriptor in accordance with one embodiment of the present invention.
Figure 3B:
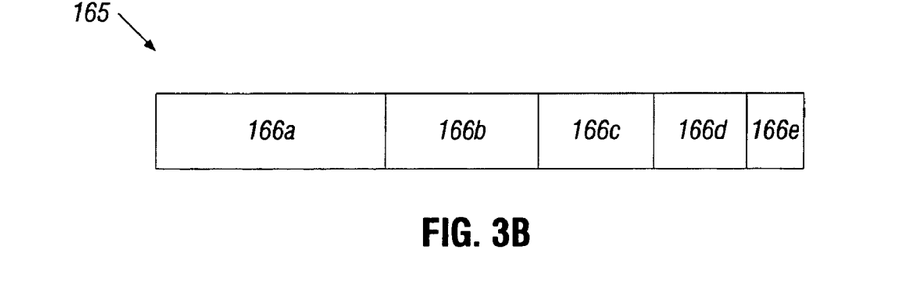
FIG. 3B is a block diagram of a sequencer privilege descriptor in accordance with another embodiment of the present invention.
Figure 3C:
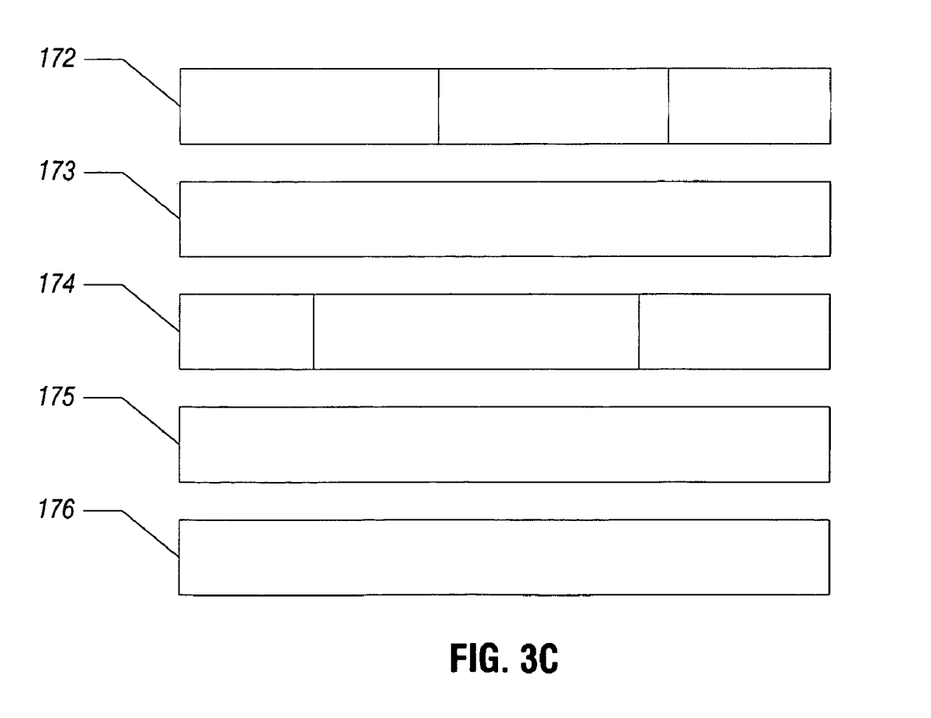
FIG. 3C is a block diagram of a plurality of sequencer privilege descriptor registers in accordance with another embodiment of the present invention.

In a minimalist embodiment, all bit-fields may assume the same value and thus can be reduced to a single bit-field representing a single user-level privilege for the sequencer as a whole. In other embodiments, different SPD bit-fields can simultaneously assume different privilege values. Referring now to FIG. 3A, shown is a block diagram of a sequence privilege descriptor in accordance with one embodiment of the present invention. As shown in FIG. 3A, a SPD 160 may be a storage such as a register of a single field. In one such embodiment, the single field may be a one-bit field to indicate a user-level privilege level for all of the architectural resources of the associated AMS. That is, in the embodiment of FIG. 3A, SPD 160 may provide a single value that indicates a common user-level privilege level for each architectural resource. However, in other implementations more refined privilege levels may be provided for different types of architectural resources. Referring now to FIG. 3B, shown is a block diagram of a SPD in accordance with another embodiment of the present invention. As shown in FIG. 3B, SPD 165 includes a plurality of fields $166_a$-$166_e$ (generically field 166). Each field 166 may be associated with a different type of architectural resource, e.g., register, memory resource, opcode resource, event/scenario resource, (i.e., named/encoded architectural entity in a given ISA) or so forth. Thus in the embodiment of FIG. 3B, SPD 165 may include multiple bit-fields each corresponding to a privilege value for a distinct category of application architectural resource. In some embodiments, these SPD bit-fields can be manifested as separate architectural SPD registers. Thus as shown in FIG. 3C, a plurality of SPD registers 172-176 may be present in a given embodiment, each associated with a particular resource such as memory, register, and so forth. Some of these registers may include a single field to set forth a user-level privilege level for all such resources, while other registers may include multiple fields to provide for finer-grained control.

Figure 3D:
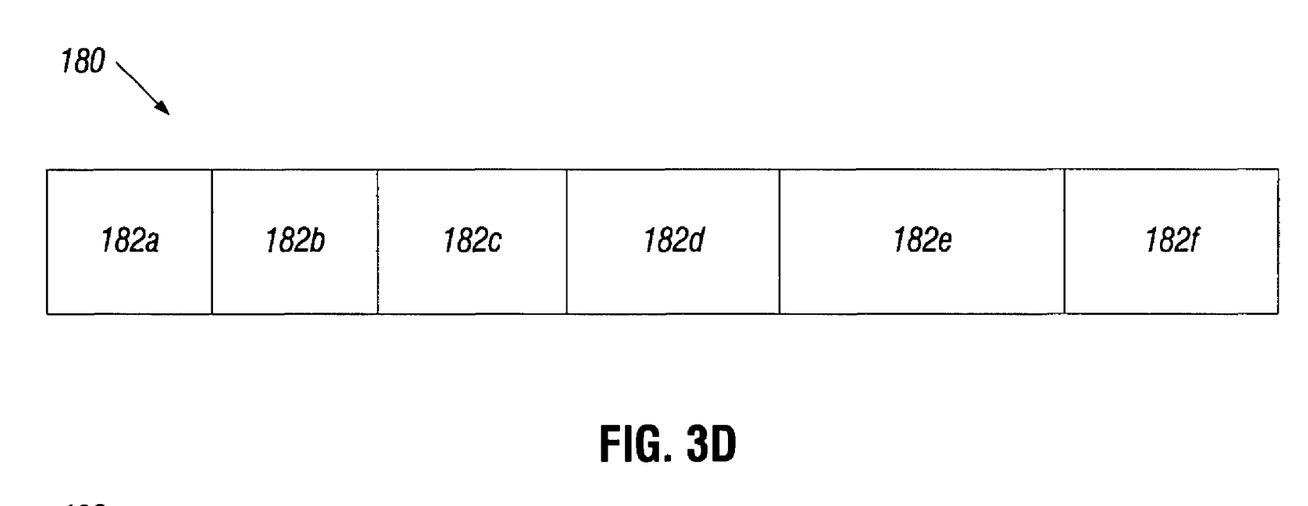
FIG. 3D is a block diagram of a composite sequencer privilege descriptor for controlling register access in accordance with an embodiment of the present invention.

Referring now to FIG. 3D, shown is a block diagram of a composite SPD for controlling register access in accordance with an embodiment of the present invention. As shown in FIG. 3D, SPD 180 includes a plurality of fields $182_a$-$182_f$ (generically field 182). Each field may be associated with a particular type of register. For example, in one implementation each field $182_{a-f}$ may correspond to a given one of flag registers, segment descriptors, extended multimedia registers, floating point registers, and general purpose registers, respectively. In one implementation, each field may be a single bit having a first value, e.g., zero to indicate access permission, and a second value, e.g., one to indicate access prevention. In other embodiments, each field 182 may be multiple bits to indicate varying levels of permission.

Figure 3E:
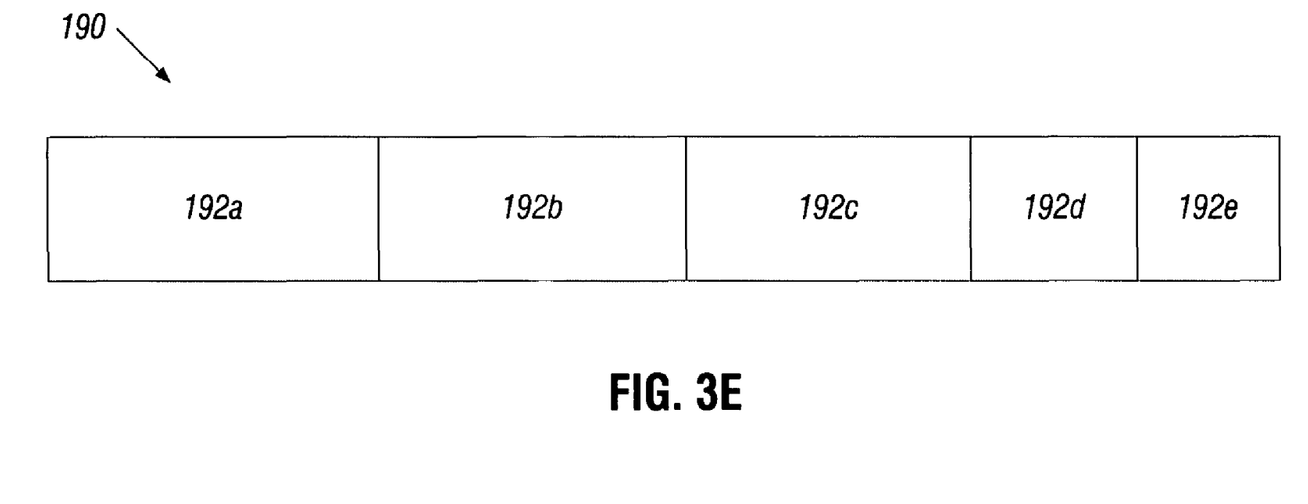
FIG. 3E is a block diagram of a composite sequencer privilege descriptor for accessing memory in accordance with an embodiment of the present invention.

Referring now to FIG. 3E, shown is a block diagram of a composite SPD for accessing memory in accordance with an embodiment of the present invention. As shown in FIG. 3E SPD 190 includes a plurality of fields $192_a$-$192_e$ (generically field 192). Each field may be used to indicate at a number of bits for micro-page indices. Specifically, in one implementation entry $192_a$ may correspond to a page index, entry $192_b$ to a micro-page index, entry $192_c$ to a micro-page offset, entry $192_d$ to a cache line index, and entry $192_e$ to a chunk offset. While shown with this particular implementation in the embodiment of FIG. 3E, the scope of the present invention is not limited in this regard.

For a given AMS, the default value for SPD may be a value of 0, indicating the same privilege level as the OMS (which is at CPL3). In other words, the default behavior of a SPD-equipped multi-sequencer system may be a legacy state. This default behavior may thus ensure backwards compatibility for SPD-agnostic legacy multi-shredded applications. For convenience, the value of a SPD on a given sequencer may be referred to as a user-level privilege level (UPL) for the sequencer.

The value of a UPL may be defined as either architecturally binding or a hint (or both). For example, a UPL value from 1 to 255 may be architecturally binding, while a value greater than 255 can be assigned by an application as an architecturally non-binding hint. For a given architectural resource category, its binding UPL defines rules on the scope and restriction of access. Depending upon the resource category, the UPL and its associated accessible scope of resource can be bit-level composite or numerically monotonically scaled. In the context of a register resource (like a general program register (GPR), extended multimedia register (XMMR), floating point register (FPR), segment descriptor registers, etc.), a composite UPL may be used, where each bit in the UPL indicates a distinct group of registers (e.g., GPR vs. FPR) or even a distinct individual register. Effectively, the UPL becomes a bit-map for which different bit-pattern/combinations indicate a subset of the overall application register architecture states. To be consistent with the default behavior for backward compatibility, a bit value of 1 may indicate exclusion/restriction prohibiting access to the denoted register category. In some embodiments, the primary usage model of register access discrimination may be to enforce confined writes to certain registers, while reads to registers may always be allowed.

For a memory resource, a composite UPL may be used, where the UPL can represent the number of bits in a virtual address (VA) for a micro-page index. Since the granularity of a micro-page can range from a full page to a cacheline, an application program can have a vast degree of freedom to define user-level application managed virtual memory access privilege. For other resource categories such as events and opcodes, similar composite UPL can be defined. Or alternatively, a monotonic value can be architecturally defined to limit the specific scope of enumerated subsets of scenarios or opcodes.

An AMS' privilege value as reflected in its SPD may only be directly programmed via an inter-sequencer state access operation (e.g., a SXFR or SXFR-implemented composite instruction) by the OMS to which the AMS is attached. However, any AMS can attempt to use the same instruction(s) to program the SPD of another AMS or itself. By default, such attempt may incur proxy execution back to the OMS where the application software at a root UPL can check the current UPL of the faulting AMS according to the application program specific management policy and make a decision on whether to serve or deny the proxy request. Should the proxy request be served, the OMS will program the destination AMS' privilege level on behalf of the initiating AMS. Accordingly, the OMS is the final arbiter of UPL assignments between AMSs. Depending on differences in the category of accessible resources, UPL management policy may be enforced differently in hardware, firmware, and software levels in various embodiments.

Figure 4:
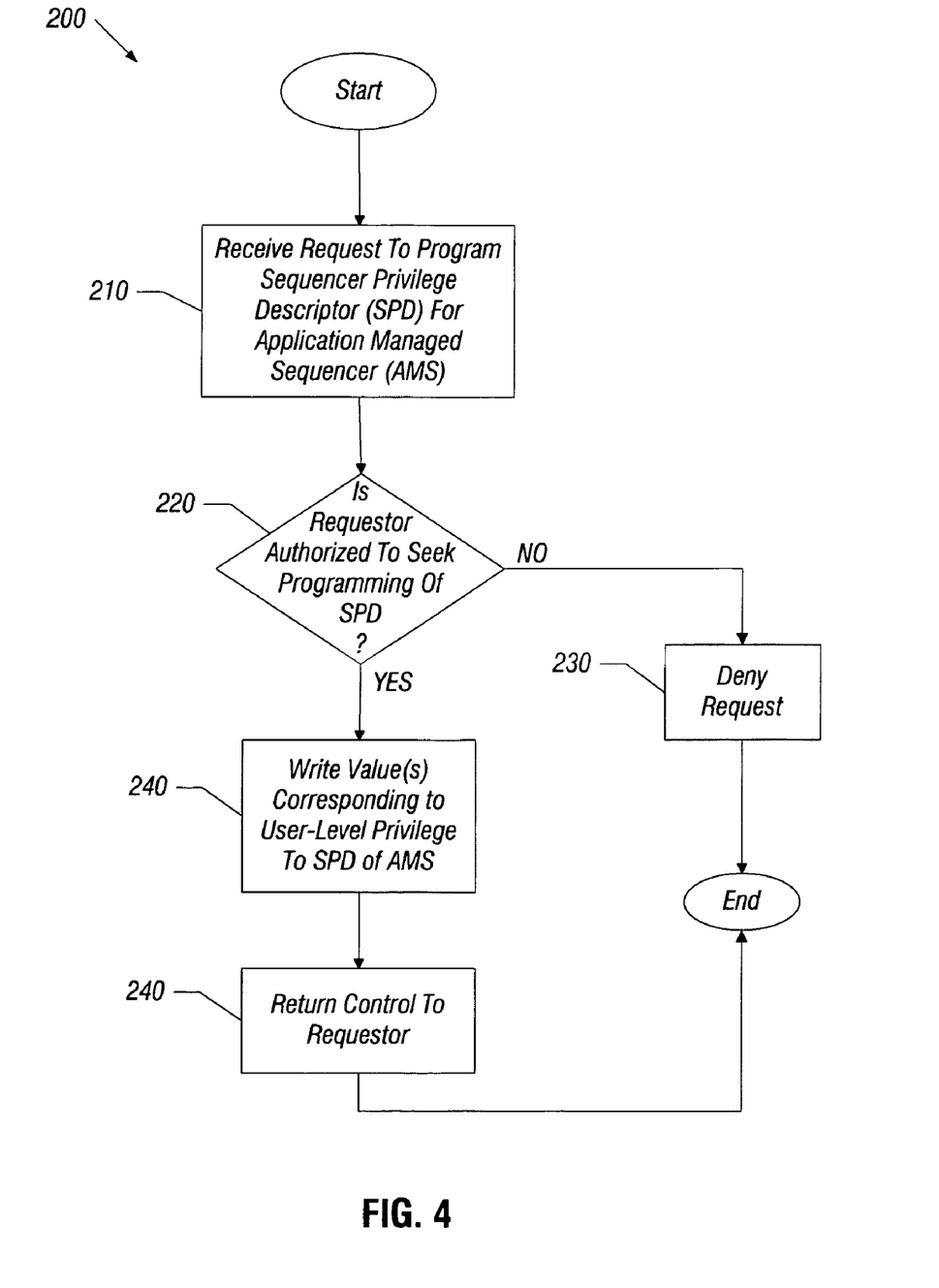
FIG. 4 is a flow diagram of a method of programming a sequencer privilege descriptor in accordance with an embodiment of the present invention.

Referring now to FIG. 4, shown is a flow diagram of a method of programming an SPD in accordance with an embodiment of the present invention. As shown in FIG. 4, method 200 may begin by receiving a request to program an SPD for a given AMS (block 210). For example, the request may be received by an OMS from another AMS. Alternately, the request may be initiated within the OMS to execute a given chunk of an application that may potentially include a virus or other malicious code.

Referring still to FIG. 4, next it may be determined whether the requestor is authorized to seek programming of the SPD (diamond 220). In instances where the requestor is the OMS, it may be assumed that valid authorization exists. For requests coming from another AMS, a determination of authorization may be made based on the privilege level associated with the requesting AMS and the privilege level to be attributed to the AMS to be programmed. That is, a first AMS may request programming of a privilege level for a second AMS that is lower than or equal to the first AMS, but not greater than the privilege level of the first AMS, in some embodiments. If it is determined that the authorization is not present, the request may be denied (block 230), and method 200 may conclude. If instead it is determined that programming is authorized, control passes to block 240.

At block 240, one or more values corresponding to the user-level privilege may be written to the SPD of the AMS to be programmed (block 240). The values to be written may be those requested by the requestor and may vary in different embodiments. For example, in some implementations, a single global value may provide a composite user-level privilege for the AMS. For example, architectural resources of the AMS, e.g., registers, memory, scenarios and so forth may be set at the same level which may correspond to a more restricted privilege level than a legacy user-level privilege (e.g., Ring 3 in some implementations). From block 240, control passes to block 250, where control may be returned to the requester, and method 200 concludes. For example, if a first OMS sought programming of a second AMS via the OMS, a transfer operation, e.g., a shred transfer operation may return control back to the originating AMS. While shown with this particular implementation in the embodiment of FIG. 4, the scope of the present invention is not limited in this regard.

As described above, the register resource UPL can be represented in various forms such as a bit-map (e.g., a so-called blacklist) of register resources prohibited from access. To enforce the access discrimination, the UPL can be used in various pipeline stages concerning reference made to a register alias table (RAT). During instruction execution, a register renaming stage occurs when a virtual register is mapped to a physical register. In some embodiments, the UPL bit-map can be used to err on allocation to a blacklisted RAT entry. The instruction or micro-operation (uop) of concern can be marked with an exception bit that can raise an access violation exception before instruction retirement. Since the allocation stage during register renaming is at the critical path of a processor pipeline, the checking and enforcement logic potentially can be less complexity-efficient. In some embodiments, source register reads may avoid a blacklist check since a read operation is typically permissible and only the write operation to a register is under discrimination control.

Later, during an exception detection stage(s), which occur when an instruction or uop is found to be retirable and at the early write-back to the architectural register file (RF), the SPD or blacklist of the destination register can be checked. Should the write-back register be on the blacklist, the uop may incur an exception due to the access violation.

Figure 5:
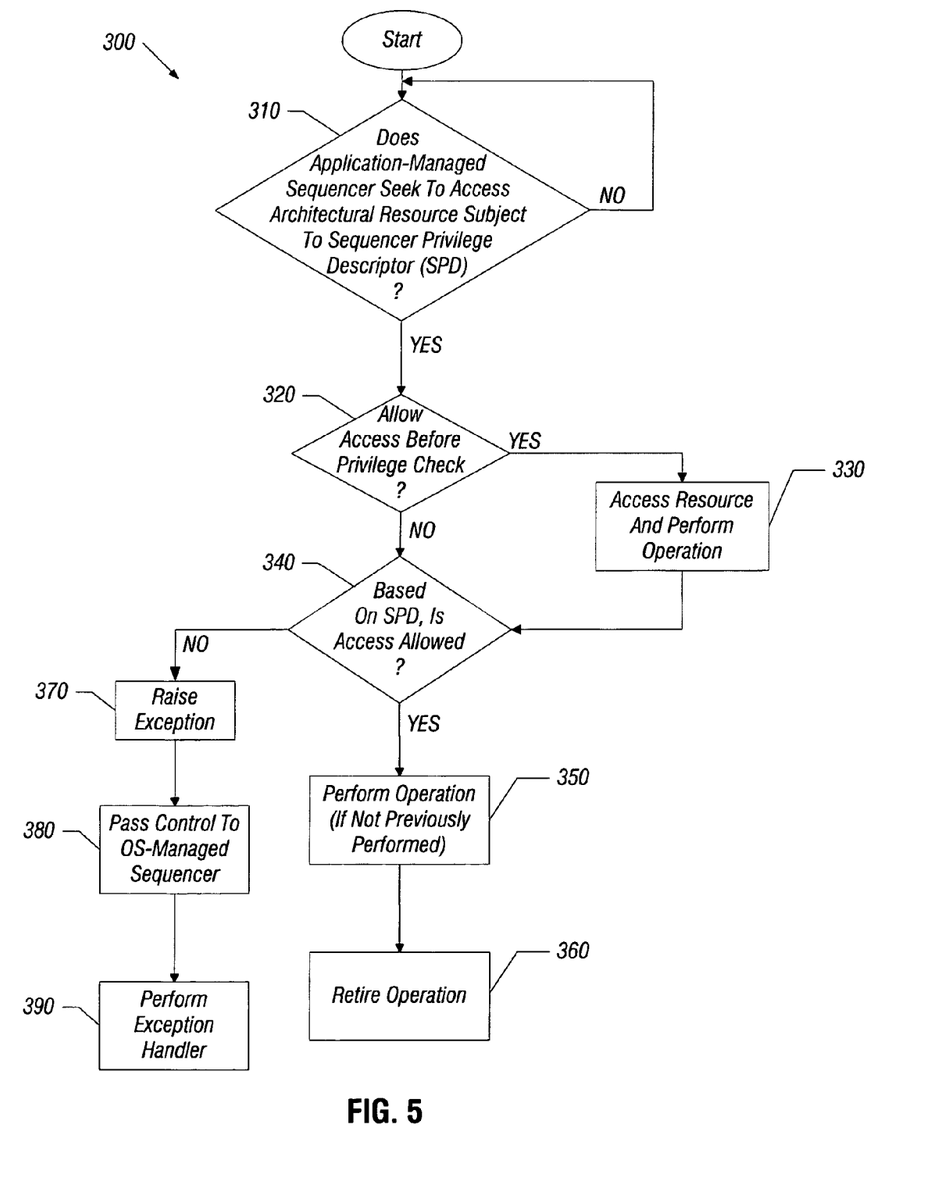
FIG. 5 is a flow diagram of a method of controlling access to an architectural resource in accordance with an embodiment of the present invention.

Referring now to FIG. 5, shown is a flow diagram of a method of controlling access to an architectural resource in accordance with an embodiment of the present invention. As shown in FIG. 5, method 300 may be implemented when an AMS that has a programmed SPD seeks to perform an operation that accesses an architectural resource subject to the SPD. Referring to FIG. 5, method 300 may begin by determining whether an AMS seeks to access such an architectural resource (diamond 310). If not, diamond 310 may loop back on itself.

If instead an architectural resource that is protected by a SPD is to be accessed, it may be determined whether such access is to be allowed prior to performing a privilege check (diamond 320). That is, to improve operation control may be set in a given AMS to allow access to protected resources prior to completing a privilege check. In this way, operations in the critical path may continue and a privilege check may be performed in parallel, e.g., off the critical path. If access is allowed before a privilege check, control passes to block 330, where the resource is accessed and an operation performed. For example, the operation may correspond to an instruction that is to write a result to one of a given class of registers, e.g., a floating point register. From block 330, control passes to diamond 340, which also receives control from diamond 320 if a privilege check is required before access is permitted. At diamond 340, the privilege check may be performed. That is, the AMS may access its SPD associated with the resource at issue to determine whether the AMS is allowed to access the resource in the requested way. For example, a SPD may set forth a user-level privilege that allows access to a given register, but not a write. If the access is allowed, control passes to block 350, where the operation may be performed (if not previously performed, as discussed above). Then the operation may be retired, e.g., in normal program order (block 360).

If instead at diamond 340 it is determined that the access is not allowed, control passes to block 370. At block 370, an exception may be raised. For example, in the above example of the register access, an access violation exception flag may be set. Control then passes to block 380, where control may be passed to an OMS. This OMS may then handle the exception (block 390). For example, the OMS may take various actions depending on the type of resource and exception that is raised. For example, one of different exception handlers of the OMS may be executed. In the example of an application executed on an AMS that may include untrusted or malicious code, the exception may be indicative that this malicious code sought to access protected registers, memory or so forth. Accordingly, the exception handler may take various actions, including segregating the malicious code, preventing its future execution, reporting on the exception to a user, or so forth. While shown with this particular implementation in the embodiment of FIG. 5, the scope of the present is not limited in this regard.

With regard to memory resource accesses, in one embodiment a memory resource UPL can be used to represent the number of bits for a micro-page index. This UPL value can then be used to enforce access control over the granularity of micro-pages as defined by the UPL. In a minimal embodiment with the least hardware requirement (and lesser performance), once an AMS's UPL is assigned with a non-zero value, then every virtual to physical (VA to PA) address translation on the AMS will incur a proxy request to the OMS prior to instruction retirement.

In the case of a TLB "hit," the proxy request is handled by an OMS handler to check the VA against the application software's own micro-page table to verify access privilege to VA. Should the AMS have the application-defined legitimate user-level access permission, the OMS may signal the AMS to retire the suspended instruction. Otherwise, the OMS may consider the AMS' access to be a violation. In the case of a TLB "miss," on a sequencer supporting a hardware page walker, the miss can be served by the hardware mechanism, and the ensuing "hit" may be handled as above. In the case of a TLB "miss" in which the hardware page walker detects a page fault, page fault proxy execution may be enacted, and then the ensuing "hit" will be handled above.

In other embodiments, various degrees of additional hardware support can be provided at the AMS level to accelerate performance. For minimal hardware acceleration, an additional bit can be included in every TLB entry in the AMS to control whether a hit on the corresponding entry will require proxy execution to the OMS. This bit can be programmed and used by the page fault proxy execution mechanism. Once a page fault is handled at the OMS, prior to resuming the AMS, the OMS handler may check the faulting VA against the user-level application defined access privilege at micro-page granularity. In particular, the OMS handler will check if the full page where the faulting micro-page resides is accessible to the shred running on the AMS. If so, the OMS can force fill the page table entry for the faulting VA into the AMS' TLB with the proxy-escape bit turned ON. If the proxy-escape bit is ON, then a retirable instruction with a TLB hit can retire without having to check with the OMS. This bit thus indicates that application program has verified on the OMS that the shred on the AMS has the correct access permission on the entire page of interest.

Modem TLB's support variable page sizes. In particular, most TLB's support a super-page (e.g., 1 gigabyte (GB) page size). When an OS uses a super-page, a basic page (e.g., 4K) supported in the hardware effectively becomes the smallest granularity for hardware support of a micro-page. In other words, an application can define a user-level page table to manage access privilege at such micro-page level, with the following manipulation of the TLB. When the non-zero UPL (e.g., of 4K page size) is programmed in an AMS, the AMS' TLB upon a miss will cause proxy execution to the OMS first before activating the hardware page walker. The OMS handler uses an application level micro-page to attain the micro-page index, and together with a super-page (1 GB page) translation table entry forms micro-page translation entry to install in the AMS' TLB and then resume AMS execution. Now, all hits on this TLB entry becomes legitimate access to the super-page, thus requiring no further proxy execution to the OMS.

Different application software can use embodiments to implement modular software components for which different levels of user-level privilege can be defined to enable various forms of isolated resource access. A few examples are as follows using register resource access and memory access, although the scope of the present invention is not limited in this regard.

For an IA-32 ISA, due to legacy issues certain architectural states can be (indiscriminately) updated by CPL3 code and result in side effects. For example, most if not all segment registers (also called segment descriptors) can be modified by any code at CPL3. However, these states directly affect address canonicalization (i.e., forming a full virtual address from segment and linear addresses) for linear addresses in instruction pointers, stack pointers, and so forth, as well as standard registers for instruction or data accesses. In a multi-sequencer system, embodiments may be implemented to prevent code running on the AMS from updating these segment registers. In addition, there are certain architectural states that can be read at CPL3 and cause undesirable side effects. For example, a traditional x86 CPU capability enumeration instruction (CPUID read) is a CPL3 instruction that returns a value for the overall processor configuration description rather than sequencer-specific configuration information. Embodiments may be implemented to restrict read access to CPUID only to an OMS and prevent an AMS from reading it. Or alternatively, a CPUID instruction executed on a given AMS may be limited to only provide sequencer-specific capability information. To enable such discriminated access to a subset of architectural register states, the register UPL embodiments described above (e.g., as shown in FIG. 3C) can be aptly applied.

For application software that makes use of various third party independent software vendor (ISV)-supplied software modules, the overall application program is monolithic and vulnerable to various bug infestations and virus compromises. All software modules in the application, whether produced by the application programmer or activated from a third party library (and even those that are compromised by virus or bug) have equal access to the application memory.

However, using embodiments of the present invention, a judicious application program designer/architect can drastically improve reliability, security and robustness of the application. In particular, for user-level instruction and data accesses, an application programmer can apply user-level privilege management to restrict memory resource access by certain instruction groups (e.g., dynamic or static instruction streams under various conditions) in the "main" program (or crt0.o prolog runtime in extreme cases) which is guaranteed to start at an OMS. Some sample usage models are as follows.

For any memory-based working set of interest, e.g., a heap data structure, the application software can define a user-level micro-page table of micro-page granularity and associate each page entry with the user-level program specific access privilege (read (R), write (W), execute (X) and potentially other attributes of interest). The runtime startup (e.g., crt0.o or main( )) running on the OMS may be responsible for managing the heap's initial allocation and demarcation with application-specific access privilege assignments in the micro-page table. For any attempt to make a function call to an untrusted third party library application programming interface (API) (which is potentially buggy or compromised by virus), the function call may be transformed into a shred continuation creation, thus allowing application runtime to dispatch the shred (and its encapsulated third party API call) to run on an AMS that is subject to discriminated resource access.

The OMS shred or runtime then identifies an AMS and programs or configures the AMS to make it ready to run the shred. For example, a UPL initialized in the AMS may be used to indicate the number of bits for the micro-page index in the VA. This micro-page entry can be made read only until the shred completes execution of the third party call on the AMS. Then a desired underlying architectural mechanism may be used to enforce the access restriction. For example, upon any illegal store by rouge library on a micro-page, the OMS or the local TLB may detect the violation, suspend the rouge shred execution and give control back to the OMS handler.

As more asymmetry and heterogeneity are introduced to AMS's, and as multiple instruction multiple data (MIME) functional units become further diversified in terms of functionality and organization (due to power/performance efficiency concern), discriminated access to different user-level register resources may provide for further benefits. Embodiments may be partially suited to multiple processor systems that implement a multi-sequencer architecture.

Figure 6:
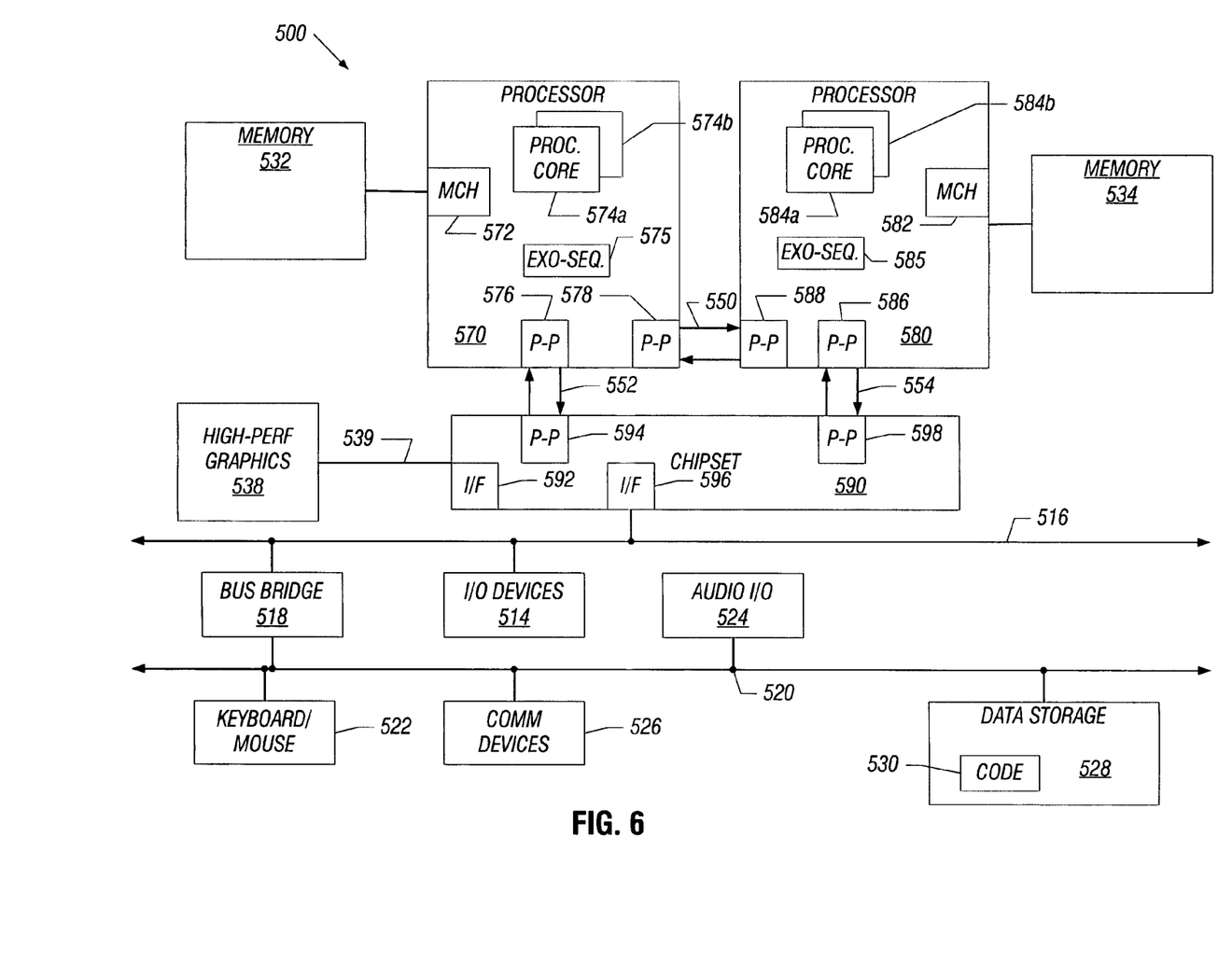
FIG. 6 is a block diagram of a system in accordance with an embodiment of the present invention.

Embodiments may be implemented in many different system types. Referring now to FIG. 6, shown is a block diagram of a multiprocessor system 500 in accordance with an embodiment of the present invention. As shown in FIG. 6, the multiprocessor system 500 is a point-to-point interconnect system, and includes a first processor 570 and a second processor 580 coupled via a point-to-point interconnect 550, although other kinds of interconnects can be used in other embodiments. As shown in FIG. 6, each of processors 570 and 580 may be multicore processors, including first and second processor cores (i.e., processor cores 574a and 574b and processor cores 584a and 584b). While not shown for ease of illustration, first processor 570 and second processor 580 (and more specifically the cores therein, which may in turn include one or more sequencers) may include exo-sequencers 578 and 585, and may perform user-level privilege management in accordance with an embodiment of the present invention. First processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 6, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the *Accelerated Graphics Port Interface Specification, Revision 2.0*, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 6, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520. Note that other architectures are possible. For example, instead of the point-to-point architecture of FIG. 6, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a request in an operating system-managed sequencer (OMS) of a hardware processor from a user-level agent for programming of a user-level privilege for at least one architectural hardware resource of an application-managed sequencer (AMS) of the processor including next instruction pointer logic coupled to the OMS that is not visible to the operating system (OS) and which operates at a lower privilege level than the OMS;
programming the user-level privilege for the at least one architectural hardware resource of the AMS using the OMS to write a value indicative of a selected privilege level to a sequencer privilege descriptor (SPD) associated with the AMS, wherein the AMS is to directly control access at the user-level to the at least one architectural hardware resource; and
converting a function call into a user-level shred, and sending the user-level shred by the OMS to the AMS, wherein the selected privilege level of the AMS is programmed to be more constrained than the OMS.

2. The method of claim 1, further comprising determining whether to program the user-level privilege based on an authority level of the user-level agent.

3. The method of claim 1, further comprising receiving the request from a second AMS for programming of the user-level privilege, wherein the AMS and the second AMS are of heterogeneous instruction set architectures.

4. The method of claim 1, wherein the value comprises a plurality of portions each corresponding to a different architectural hardware resource of the AMS.

5. The method of claim 1, further comprising determining in the AMS whether access to a first architectural hardware resource is permitted based on the user-level privilege, and if not, signaling the OMS.

6. The method of claim 5, further comprising setting a permission indicator in a page table entry of a translation lookaside buffer (TLB) of the AMS by the OMS if the user-level privilege is indicative of permitted access to the page table entry by the AMS.

7. The method of claim 6, further comprising retiring an instruction in the AMS that accesses the page table entry without signaling the OMS if the permission indicator is set.

8. The method of claim 1, further comprising detecting an access violation on the AMS responsive to the user-level shred and notifying the OMS.

9. The method of claim 1, wherein the SPD comprises a composite SPD including a plurality of fields each to indicate access to a register type.

10. The method of claim 9, wherein the programming includes setting selected ones of the plurality of fields to a first value to indicate access permission and other ones of the plurality of fields to a second value to indicate access prevention.

11. The method of claim 9, wherein each of the plurality of fields comprises a multi-bit value to identify one of a plurality of levels of permission to the corresponding register type.

12. An apparatus comprising:
an execution unit of an application-managed sequencer (AMS) of a hardware processor to perform operations on data responsive to user-level instructions, the execution unit including a plurality of application architectural resources and which is not visible to an operating system (OS) that executes on an operating system-managed sequencer (OMS);
a sequencer privilege descriptor (SPD) associated with the execution unit, the SPD to store at least one value indicative of a selected privilege level to the plurality of application architectural resources, the SPD generated at user-level responsive to a user-level request and accessible by the AMS to directly control access to the plurality of application architectural resources at the user-level; and
wherein the OMS is to convert a function call into a user-level shred, and send the user-level shred to the AMS, wherein the selected privilege level of the AMS is programmed to be more constrained than the OMS.

13. The apparatus of claim 12, wherein the SPD is to be programmed under control of the OMS associated with the execution unit.

14. The apparatus of claim 13, wherein the execution unit is to signal the OMS if an access to one of the plurality of application architectural resources violates the user-level privilege.

15. The apparatus of claim 12, wherein the SPD comprises a plurality of individual descriptors each to store an indicator corresponding to the user-level privilege for a given category of application architectural resource.

16. The apparatus of claim 15, wherein at least one of the individual descriptors includes a plurality of locations each to store an indicator corresponding to the user-level privilege of a group of registers of the execution unit.

17. The apparatus of claim 12, further comprising a second execution unit coupled to the execution unit, wherein the second execution unit is to request programming of the SPD associated with the execution unit, wherein the request is to be handled by an operating system-managed sequencer (OMS) coupled to the execution unit and the second execution unit.

18. The apparatus of claim 12, wherein the execution unit further comprises a translation lookaside buffer to store a plurality of entries each including an address translation and a permission indicator to indicate whether the execution unit is permitted to retire an instruction that accessed the corresponding entry without a transfer of control to an operation system-managed sequencer (OMS) associated with the execution unit.

19. An article comprising a non-transitory machine-readable storage medium including instructions that if executed by a machine enable the machine to perform a method comprising:
receiving a request in an operating system-managed sequencer (OMS) of a processor from a user-level agent for programming of a user-level privilege for at least one architectural hardware resource of an application-managed sequencer (AMS) of the processor, including next instruction pointer logic, coupled to the OMS that is not visible to the operating system (OS) and which operates at a lower privilege level than the OMS;
programming the user-level privilege for the at least one architectural hardware resource using the OMS to write a value indicative of a selected privilege level to a sequencer privilege descriptor (SPD) associated with the AMS, wherein the AMS is to directly control access at the user-level to the at least one architectural hardware resource; and
converting a function call into a user-level shred, and sending the user-level shred by the OMS to the AMS, wherein the selected privilege level of the AMS is programmed to be more constrained than the OMS.

20. The article of claim 19, wherein the value comprises a plurality of portions each corresponding to a different architectural hardware resource of the AMS.

21. The article of claim 19, further comprising instructions that when executed enable the machine to determine in the AMS whether access to a first architectural hardware resource is permitted based on the user-level privilege, and if not, signaling the OMS.

22. The article of claim 19, further comprising instructions that when executed enable the machine to set a permission indicator in a page table entry of a translation lookaside buffer (TLB) of the AMS by the OMS if the user-level privilege is indicative of permitted access to the page table entry by the AMS.

23. The article of claim 22, further comprising instructions that when executed enable the machine to retire an instruction in the AMS that accesses the page table entry without signaling the OMS if the permission indicator is set.

* * * * *